Nov. 13, 1956 J. E. KINGERY 2,770,716
T-SHAPED SPLIT BEAM TRACTOR LAMP
Filed Aug. 22, 1952 3 Sheets-Sheet 1
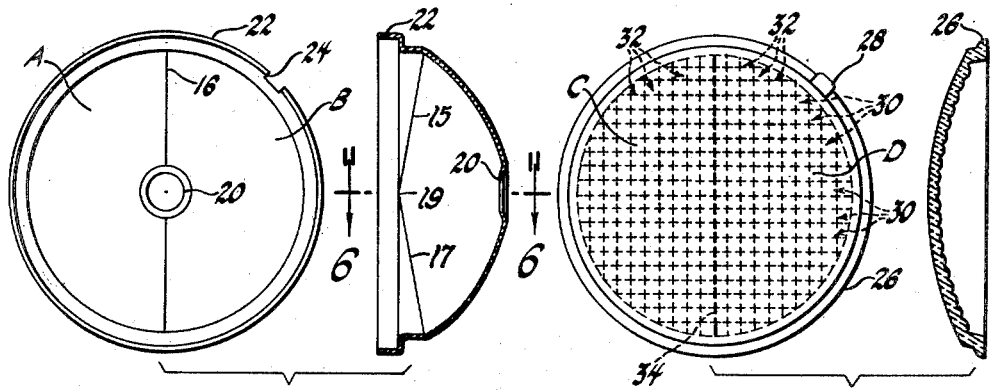
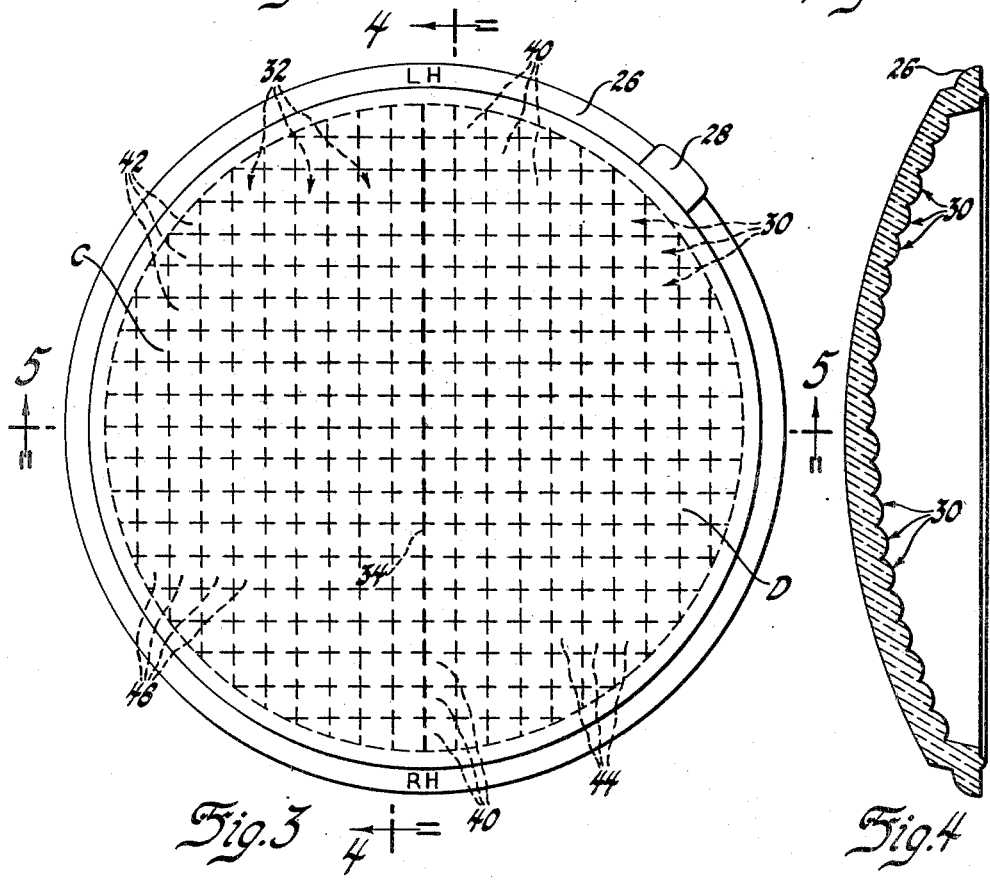
Inventor
James E. Kingery
By
Willits, Helwig & Baillio
Attorneys

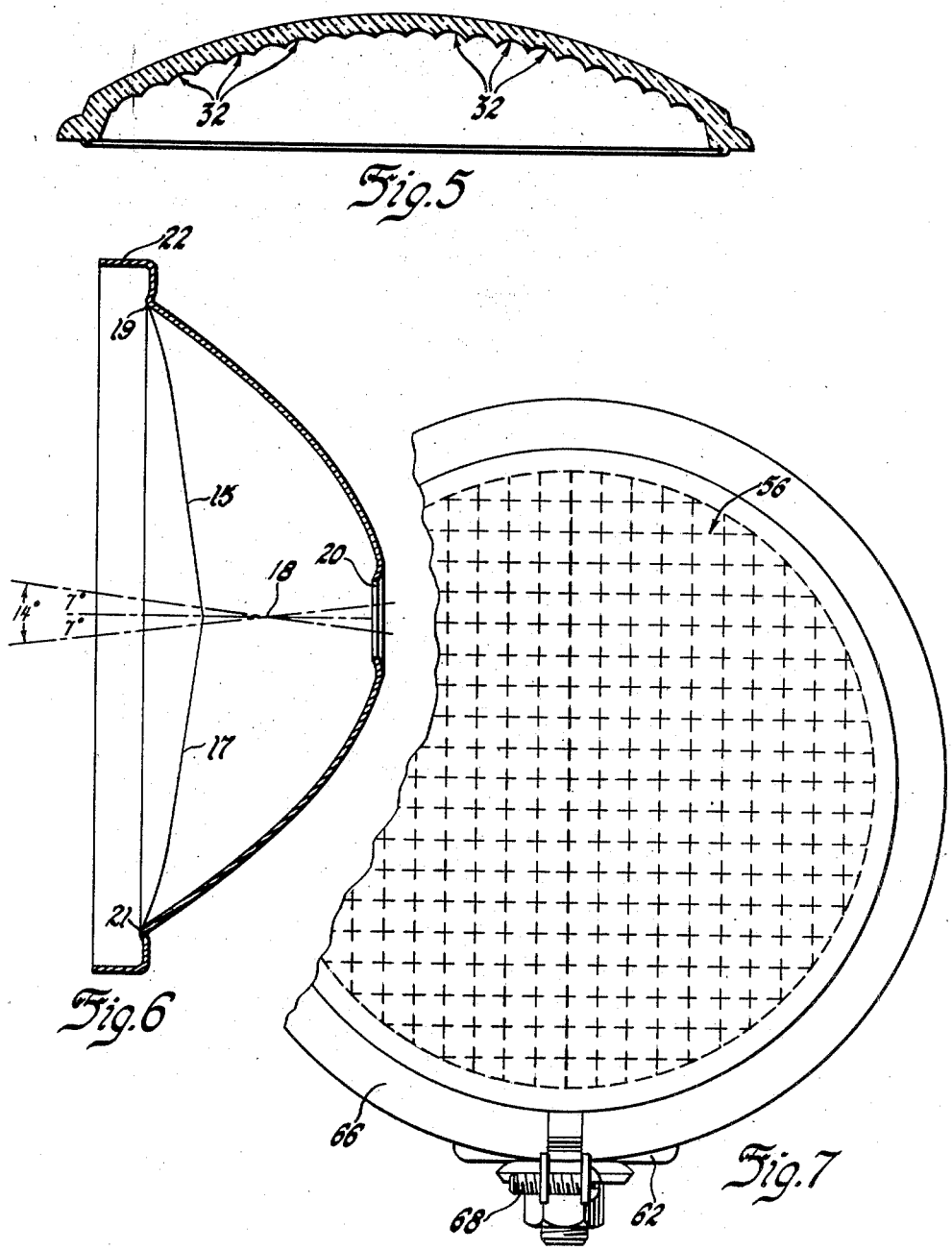

Nov. 13, 1956  J. E. KINGERY  2,770,716
T-SHAPED SPLIT BEAM TRACTOR LAMP
Filed Aug. 22, 1952  3 Sheets-Sheet 3

Inventor
James E. Kingery
By Willits, Helwig & Baillio
Attorneys

United States Patent Office 2,770,716
Patented Nov. 13, 1956

2,770,716
T-SHAPED SPLIT BEAM TRACTOR LAMP

James E. Kingery, Anderson, Ind., assignor to General Motors Corporation, Detroit, Mich., a corporation of Delaware Application August 22, 1952, Serial No. 305,793

6 Claims. (Cl. 240—41.3)

This invention relates to a vehicle lamp and more particularly to a vehicle lamp which projects a split light beam, one portion of the beam, for example, being projected directly to the front of the vehicle and another portion of the beam being projected laterally of the vehicle.

While the lamps of this invention may be used on all types of vehicles, they are particularly adapted for use as headlamps on tractors and other similar farm prime movers. As is well known, a great portion of farm work, such as plowing, etc., is done at night and for this reason tractors are furnished with lighting equipment. This lighting equipment should be such as to furnish illumination not only to the direct front but also to the sides of the direction of travel of the vehicle. While conventional headlamps provide adequate lighting straight ahead or to the direct front, they of course provide no illumination to the sides of the direction of travel and thus it has been the practice to provide separate auxiliary lights aimed so as to provide this necessary lateral illumination.

It is an object of this invention to provide a vehicle lamp which will provide both frontal and lateral illumination. Another object of the invention is the provision of an improved headlamp which projects a split beam of light, one portion of the beam being directed to illuminate the ground in front of the vehicle and another portion being directed to illuminate the ground to the sides of the direction of travel of the vehicle. Still another object of the invention is to provide a vehicle headlamp which projects an asymmetric light beam but which at the same time may interchangeably be used as either the left or right headlamp of the vehicle.

Briefly, the invention consists in the provision of a lamp having a novel lens element divided into two different lens portions, each portion having a plurality of light bending elements which cooperate to project a rectangular light pattern on a vertical screen, and a reflector divided into two portions of different light directing properties, said reflector having a predetermined orientation to the lens element so that the lens portions cooperate with the reflector portions to project a generally T-shaped light beam.

Other objects and advantages of the invention will appear more clearly from the following description of preferred embodiments and from the drawings in which:

Figure 1 shows a front view and a side view in section of the reflector.

Figure 2 shows a front view and a side view in section of the lens.

Figure 3 shows a front view of the lens drawn in larger scale than Figure 2.

Figure 4 is a view of the lens taken on the line 4—4 of Figure 3.

Figure 5 is a view of the lens taken on the line 5—5 of Figure 3.

Figure 6 is a view of the reflector taken on the line 6—6 of Figure 1 but in larger scale.

Figure 7 is a front view of a lamp embodying the invention.

Figure 8:
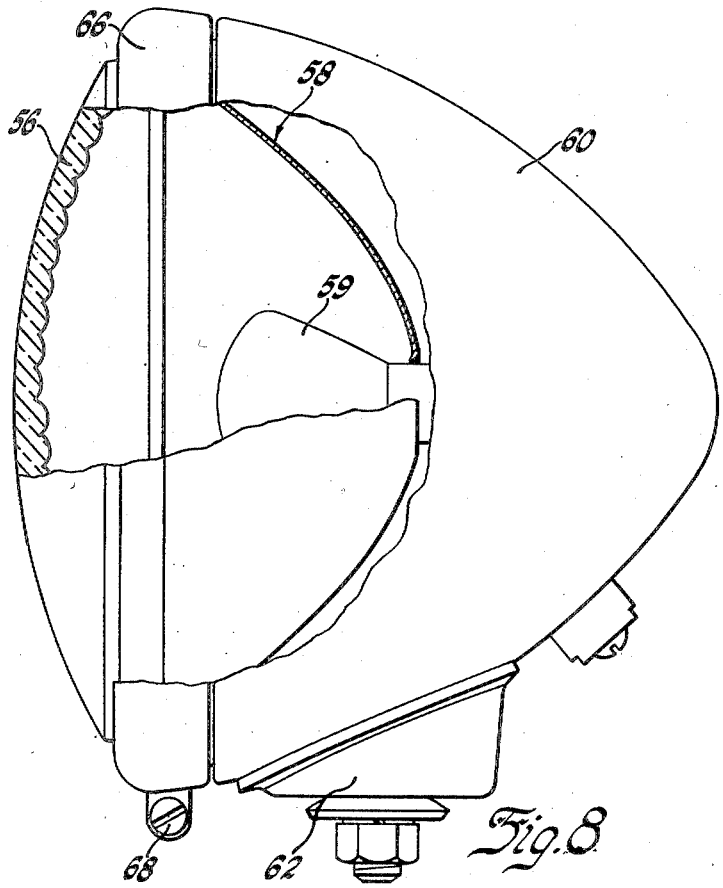
Figure 8 is a side view with parts broken away and in section, of the lamp shown in Figure 7.

Referring now to the drawings, Figure 1 shows a reflector of the type used in the lamp of this invention and consists of two parabolic reflector sections A and B joined along the line indicated at 16, and tilted toward each other in such a manner that the focal point of each reflector section is at a common point. As can best be seen in Figure 6, the focal point 18 of the reflector sections A and B is adjacent the location which is normally occupied by the filament of a lamp bulb mounted in the reflector. Still referring to Figure 6, the angle between the axes of the reflector sections is, in the preferred embodiment about 14°, each parabolic reflector section being tilted toward the longitudinal axis of the reflector at about 7°. The lines 15 and 17 in Figures 1 and 6 indicate the edges of the parabolic sections of the reflector which, because the reflector sections are tilted toward each other, are spaced from the circumferential edge of the reflector except at two points shown at 19 and 21 in Figure 6. It is to be understood, of course, that the tilt angle between the reflector halves A and B need not necessarily be 14° since other angles may be used according to the exact beam configuration desired. This will be more fully understood as the description of the invention continues.

In Figure 1 the reflector is shown properly oriented for either the right or the left front headlamp of the vehicle, the junction line 16 being perpendicular or, in other words, at 90° to the horizontal. An opening 20 in the center of the reflector serves as a mounting position for a lamp bulb.

In the embodiment shown, the reflector is provided with an outwardly extending skirt 22 for mounting the lens. As shown in Figure 2 the lens is provided with pluralities of generally parallel elongated light bending elements 30 and 32 optically superimposed and angularly disposed to each other and a peripheral flange 26 which fits into the reflector skirt 22. A locating lug 28, which cooperates with a slot 24 in the reflector skirt 22 affords means to properly orient the lens with respect to the reflector.

In the lens shown, the light bending elements consist of a plurality of horizontal flutes 30 and a plurality of vertical flutes 32 optically superimposed over the horizontal flutes. The variation in optical properties of the different flutes and flute portions as hereinafter described results in a division of the lens by an imaginary line 34 into two sections C and D having differing optical or light bending properties. When the lens is positioned on the reflector and properly oriented by means of the lug 28 as heretofore described, the dividing line of the lens will be generally parallel with and superimposed over the junction line 16 of the reflector. While in the embodiment shown the lens and the reflector are divided by the lines 16 and 34 respectively into sections of equal size and shape, the division can be otherwise. The comparative size of the lens portions and reflector sections most advantageously used will depend on the precise beam pattern desired.

Referring now to Figures 3, 4 and 5, the portions 40 of the horizontal flutes 30 to the right, as shown, of the line 34 have a radius of curvature adapted to give the light about a 40° vertical spread, while those portions 42 of the flutes to the left of line 34 have a radius of curvature to give about a 20° vertical spread. Each of the group 44 of vertical flutes 32, which is to the right, as shown, of the line 34, has a radius of curvature adapted to give the light about an 8° horizontal spread, while each of the group 46 of vertical flutes 32 which is to the left of the line 34 and has a radius of curvature which gives the light about a 20° horizontal spread.

Thus, the section D of the lens, which is to the right (as shown) of the line 34, has superimposed horizontal and vertical flutes such as will spread the light through about a 40° vertical and about an 8° horizontal angle, while the section C, while is to the left of the line 34, has superimposed horizontal and vertical flutes such as will spread the light through about a 20° vertical and about a 20° horizontal angle. In the particular lens shown the vertical flutes 32 are concave and the horizontal flutes 30 are convex; however, other combinations may of course be used. All of the flutes, both vertical and horizontal, may, for example, be convex.

Figure 9:
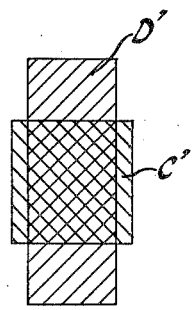
Figure 9 is a diagram of the light pattern projected by the lens of this invention when a conventional parabolic reflector is used.

If a conventional parabolic reflector were used so as to direct parallel light rays through the lens, a generally cross-shaped beam pattern (as projected on a vertical screen) would result, the horizontal cross bar of light constituting a square and the vertical cross bar constituting a rectangle. This is shown in Figure 9, the horizontal bar of light C' resulting from that portion C of the lens and the vertical bar of light D' resulting from that portion D of the lens.

It is often advantageous to use flute curvatures other than those described; the combination best employed depends on the beam pattern characteristics desired. I have found, however, that the combination described in conjunction with the preferred embodiment is excellent for use on farm vehicle headlamps.

In order to attain a smooth outer lens face, it is preferable to superimpose the vertical and horizontal flutes on the rear face of the lens. However, some or all of the flutes may of course be located on the front face of the lens. Because of the increased eye fatigue which results when the edges of the beam pattern are too well defined, I prefer to stipple the entire surface of the lens in order to cause some light scattering particularly around the edges of the light pattern.

The lens is positioned in the split type reflector as previously described, and a light bulb is mounted in the reflector in the conventional manner as shown in Figure 8. With the reflector and lens thus assembled the parabolic reflector section A cooperates with the lens section C and the parabolic reflector section B cooperates with the lens section D as described hereinafter.

The reflector section A directs parallel light rays slightly to the left (looking from the rear of the reflector-lens assembly) through the lens section C, while the reflector section B directs parallel light rays slightly to the right (looking from the rear) through the lens section D. Thus, the horizontal generally square bar of light C', shown in Figure 9, will in this way be shifted to the left, while the vertical rectangular bar of light D' will be shift to the right. The result is the generally T-shaped beam pattern shown by Figure 11 wherein C'' represents the beam resulting from the cooperation of reflector portion A with lens portion C and D'' represents the beam resulting from the cooperation of reflector portion B with lens portion D. From the above description it will be obvious that the angle between the focal axes of the reflector sections A and B will determine the amount the beam portions C' and D' are shifted and that the size and shape of the beam portions C' and D' will be determined by the curvatures of the various lens flutes. While I prefer to use a tilt angle between the reflector sections of 14° and to use the 20° by 20° and 40° by 8° flute structure described, it is to be understood that other modifications could be used, all within the spirit and scope of the invention.

Figure 10:
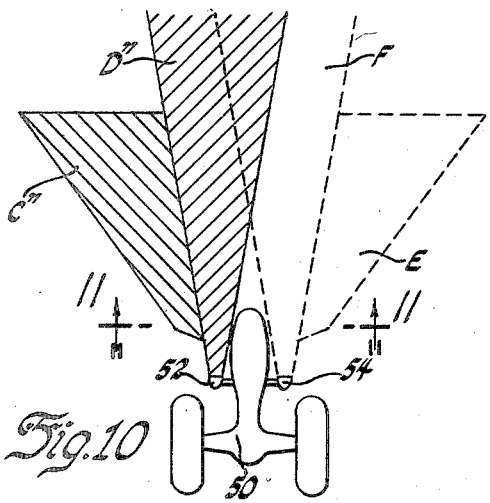
Figure 10 is a diagrammatic view of a tractor provided with the lamps of this invention and illustrates the horiontal beam pattern.
Figure 11:
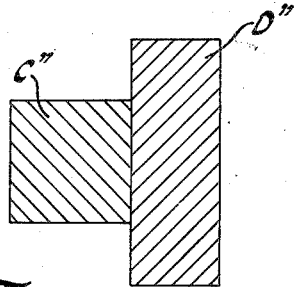
Figure 11 is an enlarged sectional view taken on the line 11—11 of Figure 10 and shows the vertical beam pattern.

Thus far the invention has described in conjunction with the left front headlamp (looking from the rear of the vehicle). The reflector-lens assembly described can be used for the right front headlamp by merely rotating it through a 180° angle. It will be noted in Figure 3 that the lens is marked Top L. H. (left hand) and Top R. H. (right hand) to indicate the correct orientation for the lens-reflector assembly for the left or right headlamp. The beam pattern resulting from the two headlamps, left and right, is shown in Figures 10 and 11 wherein 50 represents a vehicle such as a tractor, 52 the left headlamp and 54 the right headlamp. On the ground the beam pattern from each lamp is fan-shaped. The portion C'' of the beam from the left lamp projects to the left side of the tractor 50, while the portion D'' projects to the front. The right lamp, which is identical in construction to the left lamp with the exception that the lens-reflector assembly is rotated 180° as previously described, projects a beam portion E to the right of the tractor 50 and a beam portion F to the front.

The lamp housing for the reflector-lens assembly may be of any suitable type. A typical lamp embodying the invention is shown by Figures 7 and 8 in which 56 is the lens and 58 the reflector. A suitable bulb 59 is mounted in the reflector in the usual manner and the entire structure supported in a housing 60 provided with a support 62. A bezel 66 secures the lens reflector assembly in the housing and is fastened by means of a screw member 68. Other types of lamp structure may of course be used. The invention can, for example, be embodied in a seal beam type lamp unit wherein the reflector is permanently and hermetically secured to the lens.

It is to be understood that although the invention has been described with specific reference to particular embodiments thereof, it is not to be so limited. For example, all or some of the light bending elements shown herein as flutes on the lens may, if desired, be incorporated into the reflector structure rather than into the lens. Also, light bending elements other than flutes such, for example, as prisms might be used. Similarly, other alterations and changes may be made which are within the full intended scope of this invention as defined by the appended claims.

I claim:

1. A lamp comprising in combination a reflector vertically divided into two parabolic sections, the focal axes of said sections being tilted at an angle of about 14° with respect to each other, said reflector sections being of equal size and shape and having a common focal point, a lens positioned in front of said reflector the plane of said lens being substantially perpendicular to the longitudinal axis of said reflector and a light source positioned at the focal point of said reflector sections, said lens being vertically divided into two portions of equal size and shape, one of said lens portions having horizontal flutes with a radius of curvature to spread light through about a 40° angle and vertical flutes with a radius of curvature to spread light through about an 8° angle, and the other of said portions having horizontal flutes with a radius of curvature to spread light through about a 20° angle and vertical flutes with a radius of curvature to spread the light through about a 20° angle, each of said reflector sections cooperating with one of said lens portions to project a beam of light, the combination of the beams defining a generally T-shaped pattern.

2. A vehicle lamp comprising a generally cup-shaped reflector vertically divided into two parabolic sections of substantially equal size and shape, said sections being tilted inwardly toward each other so that their optical axes are at an angle with respect to each other in a substantially horizontal plane, a lens positioned in front of said reflector and a light source mounted between said reflector and said lens at the focal point of said reflector sections, said lens being divided into two portions along a vertical line substantially coinciding with the dividing line of said reflector, each of sad lens portions being provided with a plurality of substantially identical contiguous light bending elements, the light bending elements in one of said lens portions providing a greater vertical light spread than the elements in the other of said portions, one of said reflector sections cooperating with said lens portion providing the greater vertical light spread to project a frontal beam of light and the other of said reflector sections cooperating with the other of said lens portions to project a lateral beam of light at an angle to said frontal beam of light, the combination of said beams producing on a vertical screen, a generally T-shaped light pattern wherein the vertical axis of the pattern from the lateral beam is spaced from the vertical axis of the pattern from the frontal beam and the horizontal axis of the pattern from the lateral beam substantially dissects the vertical axis of the pattern from the frontal beam.

3. A vehicle lamp comprising a generally cup-shaped reflector vertically divided into two parabolic sections of substantially equal size and shape, said sections being tilted inwardly toward each other so that their optical axes are at an angle with respect to each other in a substantially horizontal plane, a lens positioned in front of said reflector and a light source mounted between said reflector and said lens at the focal point of said reflector sections, said lens being divided into two portions along a vertical line substantially coinciding with the dividing line of said reflector, each of said lens portions being provided with a plurality of substantially identical contiguous rectangular surfaces of compound curvature, the surfaces in one of said lens portions providing a greater vertical light spread and a smaller horizontal light spread than the surfaces in the other of said portions, one of said reflector sections cooperating with said lens portion providing the greater vertical light spread and the smaller horizontal light spread to project a frontal beam of light and the other of said reflector sections cooperating with the other of said lens portions to project a lateral beam of light at an angle to said frontal beam of light, the combination of said beams producing on a vertical screen a generally T-shaped light pattern wherein the vertical axis of the pattern from the lateral beam is spaced from the vertical axis of the pattern from the frontal beam and the horizontal axis of the pattern from the lateral beam substantially dissects the vertical axis of the pattern from the frontal beam.

4. A vehicle lamp comprising a generally cup-shaped reflector vertically divided into two parabolic sections of substantially equal size and shape, said sections being tilted inwardly toward each other so that their optical axes are at an angle with respect to each other in a substantially horizontal plane, a lens positioned in front of said reflector and a light source mounted between said reflector and said lens at the focal point of said reflector, said lens being divided into two portions along a vertical line substantially coinciding with the dividing line of said reflector, each of said lens portions being provided with a plurality of substantially identical contiguous rectangular surfaces of compound curvature, the curvature of the surfaces in one of said lens portions being such as to produce on a vertical screen a vertically disposed elongated rectangular light pattern and the curvature of the surfaces in the other of said portions being such as to produce on a vertical screen a generally square light pattern, one of said reflector sections cooperating with said lens portion providing the elongated rectangular light pattern to project a frontal beam of light and the other of said reflector sections cooperating with the lens portions providing the generally square light pattern to project a lateral beam of light at an angle to said frontal beam of light, the combination of said beams producing on a vertical screen a generally T-shaped light pattern wherein the vertical axis of the pattern from the lateral beam is spaced from the vertical axis of the pattern from the frontal beam and the horizontal axis of the pattern from the lateral beam substantially dissects the vertical axis of the pattern from the frontal beam.

5. A vehicle lamp comprising a generally cup-shaped reflector vertically divided into two parabolic sections of substantially equal size and shape, said sections being tilted inwardly toward each other so that their optical axes are at an angle with respect to each other in a substantially horizontal plane, a lens positioned in front of said rejector and a light source mounted between said reflector and said lens at the focal point of said reflector sections, said lens having extending thereacross a plurality of vertical flutes parallel to the dividing line of said reflector and a plurality of horizontal flutes superimposed over said vertical flutes, all of the vertical flutes on one side of the dividing line of said reflector having a greater radius of curvature than the vertical flutes on the other side of the dividing line of said reflector and those portions of the horizontal flutes on one side of the dividing line of said reflector having a greater radius of curvature than those portions of the horizontal flutes on the other side of the dividing line of said reflector, said lens thereby being divided into two portions along a vertical line substantially coinciding with the dividing line of said reflector with one of said portions providing a greater vertical light spread than the other of said portions, one of said reflector sections cooperating with said lens portion providing the greater vertical light spread to project a frontal beam of light and the other of said reflector sections cooperating with the other of said lens portions to project a lateral beam of light at an angle to said frontal beam of light, the combination of said beams producing on a vertical screen a generally T-shaped light pattern wherein the vertical axis of the pattern from the lateral beam is spaced from the vertical axis of the pattern from the frontal beam and the horizontal axis of the pattern from the lateral beam substantially dissects the vertical axis of the pattern from the frontal beam.

6. A vehicle lamp comprising a reflector vertically divided into two parabolic sections of substantially equal size and shape tilted inwardly toward each other, the focal axes of said sections being at an angle of about 14° with respect to each other in a substantially horizontal plane, a lens positioned in front of said reflector and a light source positioned at the focal point of said reflector sections, said lens being vertically divided into two portions of substantially equal size and shape along a line substantially coinciding with the dividing line of said reflector, one of said lens portions having horizontal flutes with a radius of curvature to spread light through about a 40° angle and vertical flutes with a radius of curvature to spread light through about an 8° angle, and the other of said portions having horizontal flutes with a radius of curvature to spread light through about a 20° angle and vertical flutes with a radius of curvature to spread the light through about a 20° angle, each of said reflector sections cooperating with one of said lens portions to project a beam of light, the combination of the beams defining a generally T-shaped pattern on a vertical screen.

References Cited in the file of this patent

UNITED STATES PATENTS

| | | |
|---|---|---|
| 1,345,073 | Clark | June 29, 1920 |
| 1,991,866 | Rich | Feb. 19, 1935 |
| 2,253,615 | Falge et al. | Aug. 26, 1941 |
| 2,551,954 | Lehman | May 8, 1951 |
| 2,568,494 | Geissbuhler | Sept. 18, 1951 |

FOREIGN PATENTS

| | | |
|---|---|---|
| 188,720 | Great Britain | Nov. 14, 1922 |